E. G. Patterson.

Railroad Chair.

No. 3,301. Reissued Feb. 10, 1869.

Witnesses: Mm. A. Morgan, G. C. Cotton.

Inventor: E. G. Patterson, per Munn & Co, Attorneys.

N. PETERS, PHOTO-LITHOGRAPHER, WASHINGTON, D. C.

UNITED STATES PATENT OFFICE.

E. G. PATTERSON, OF PITHOLE CITY, PENNSYLVANIA.

IMPROVED RAILWAY-RAIL JOINT.

Specification forming part of Letters Patent No. 82,744, dated October 6, 1868; Reissue No. 3,301, dated February 16, 1869.

*To all whom it may concern:*

Be it known that I, E. G. PATTERSON, of Pithole City, Venango county, Pennsylvania, have invented a new and useful Improvement in Rail Joints or Couplings; and I do hereby declare that the following is a full, clear, and exact description thereof, which will enable others skilled in the art to make and use the same, reference being had to the accompanying drawings, forming a part of this specification.

Figure 1:
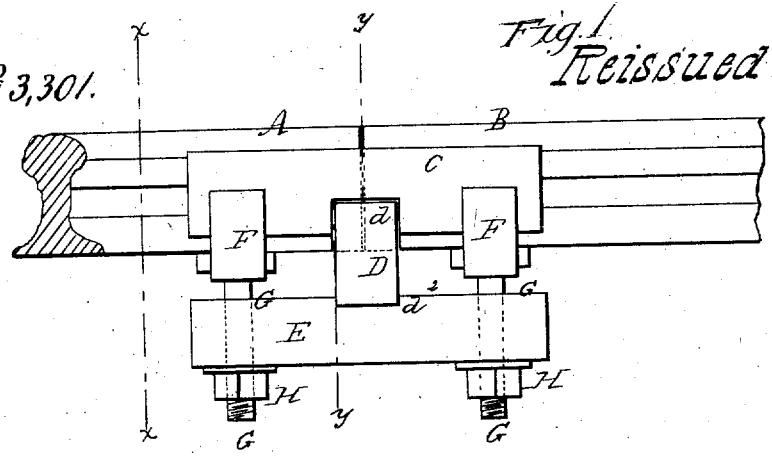
Figure 2:
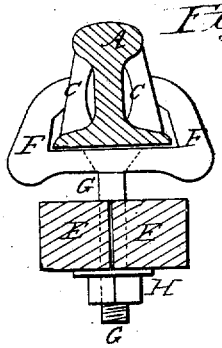
Figure 3:
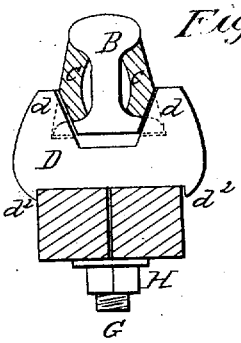

Figure 1 is a side view of the contiguous ends of two adjacent rails to which my improved coupling has been attached. Fig. 2 is a detail sectional view of the same, taken through the line *x x*, Fig. 1. Fig. 3 is a detail sectional view of the same, taken through the line *y y*, Fig. 1.

Similar letters of reference indicate corresponding parts.

My invention has for its object to furnish an improved coupling or joint for the rails of railroad-tracks, which shall be so constructed as to securely connect the ends of the rails to each other, without weakening the said rails by the formation of bolt-holes, and in such a manner that the said ends may receive a steady straining-support; and it consists in the construction and combination of various parts of the coupling, as hereinafter more fully described.

A and B are the adjacent ends of two contiguous rails.

C are the fish plates or bars, which extend along the sides of the ends A and B of the rails, between the top and base flanges of said rails. The inner sides of the fish-plates C are hollowed out, so that they may bear only against the top and base flanges of said rails, and their outer sides are made sloping or inclining outward, as shown in Figs. 1 and 2.

D is the chair, which is placed directly beneath the joint, between the ends A and B of the rails. The inner surface of the upwardly-projecting jaws $d'$ of the chair inclines outward and enters inclined notches in the bottom flanges in the ends of the rails A and B, and in the lower parts of the outer or sloping sides of the fish-plates C, as shown in Fig. 3, so that the pressure of any weight upon the ends A and B of the rails may force the said rails and fish-plates more closely together by forcing them farther down between the inclined jaws of the said chair. The bottom of the chair D rests upon the middle part of the wooden bars E, which said bars E are kept from lateral movement or displacement by the lips $d^2$, formed upon the ends of the under side of the chair D, and which overlap the sides of the said bars E.

F are the clamps which clasp the inclined or sloping outer sides of the fish bars or plates C, and the inner sides of the jaws of which are hollowed out, so that they may not bear against the edges of the bottom flanges of the rails A and B.

G are bolts, the heads of which are squared and countersunk in the bottom plate of the clamps F, as shown in dotted lines in Fig. 2, and which pass through holes through the ends of the bar E when said bar is made in one piece, and through notches in the adjacent sides of the bars E when made in two parts or pieces. The bars E are held in place by washers and nuts H, placed upon the lower ends of the said bolts G. By this construction the fish-plates C carry the weight, and are the main support to the ends of the rails, the chair, clamps, wooden bars, &c., being designed, primarily, to keep the fish plates or bars securely in place. If the fish-plates C should yield, a depression at the weak point, which is the joint of the rails, forces the said plates C more firmly into the chair D, causing the said fish-plates to hug the rails more closely. The pressure exerted upon the chair D is communicated by the elastic wooden bars E to the clamps F, causing the said clamps to more firmly bind the fish-plates C. The wooden bars E being screwed up by means of the bolts G and nuts H to a steady straining-point, the rails obtain their steady aid in supporting the load upon the fish-plate, making the coupling act as a truss.

It should be observed that loosening the nuts H, so that the bars E may be free from the lips $d^2$, allows the said bars E to be removed, when the clamps F may be easily slipped from the ends of the fish-plates, and the chair D and fish-plates C may be conveniently and easily detached without in the least disturbing the rails.

I claim as new and desire to secure by Letters Patent—

1. The chair D, made with the inner sides of its jaws inclined or wedge-shaped, substantially as herein shown and described, and for the purpose set forth.

2. The clamps F, constructed as described, and provided with bolts G and nuts H, in combination with the fish-plates C, by which they are supported, and with the wooden bar or bars E, which they support, substantially as herein shown and described, for the purpose set forth.

3. The combination of the fish-plates C and chair D with each other and with the ends A and B of the rails, substantially as herein shown and described, to form a rigid support for the said ends of said rails.

4. The combination of the fish-plates C, chair D, wooden bar or bars E, and clamps F, with each other and with the ends A and B of the rails, substantially as herein shown and described, and for the purpose set forth.

5. The fish-plates C, constructed in such a way as to bear wholly, or nearly so, upon the bottom flanges of the rails, and having inclined notches in their outer or sloping sides, substantially as herein shown and described, and for the purpose set forth.

The above specification of my invention signed by me this 15th day of January, 1869.

E. G. PATTERSON.

Witnesses:

FRANK BLOCKLEY,

JAMES T. GRAHAM.